Patented Dec. 1, 1953

2,661,370

UNITED STATES PATENT OFFICE 2,661,370

HEXAMETHYLENE-1:6-BIS-TRIMETHYL-AMMONIUM BITARTRATE

Harry James Barber, Dagenham, England, assignor to May & Baker Limited, Dagenham, England, a British company No Drawing. Application October 18, 1951, Serial No. 252,004

Claims priority, application Great Britain October 27, 1950

5 Claims. (Cl. 260—501)

This invention has for its object to provide a new quaternary ammonium compound having therapeutic properties, pharmaceutical preparations containing the same and a novel process for preparing the said compound.

It is known that hexamethylene-1:6-bis-trimethyl ammonium salts possess ganglionic blocking activity and have recently been introduced in the form of the dibromide or di-iodide. However, experience has shown that these compounds can give rise to undesirable side-effects such, for example, as in the treatment of patients suffering from hypertension.

In efforts to discover a satisfactory practical alternative to the halides, the present applicant made and investigated a considerable number of other salts only to find that they would not meet the necessary criteria for a suitable compound. He has, however, discovered one such salt which is relatively easy to manufacture and which has therapeutic advantage over the corresponding bromide and iodide while possessing physical properties such that it can readily be isolated in the pure state and can be satisfactorily processed into tablet form or into other pharmaceutical presentations in the dispensary.

The new salt of the present invention is the bitartrate which clinical and chemical experience to date has unexpectedly shown to possess—in contradistinction to the large number of other salts examined such as the neutral sulphate, the acid sulphate, carbonate, dihydrogen phosphate, the neutral tartrate, citrate and methosulphate—the desirable properties above referred to.

According to one feature of the present invention, a pharmaceutical preparation possessing ganglionic blocking activity comprises hexamethylene-1:6 - bis - trimethylammonium bitartrate, preferably as a compressed tablet or as an elixir in association with an excipient or diluent of the type normally employed in pharmaceutical preparations, that is to say one which is free from undesirable pharmacological activity.

According to a further feature of the present invention, the new therapeutically active salt is prepared by reacting the corresponding embonate (as hereinafter defined) or the corresponding hydroxide with tartaric acid or acid salt thereof. The preferred process consists in first forming the di-quaternary ammonium salt of 2:2-dihydroxy-1:1-dinaphthylmethane - 3:3 - di-carboxylic acid (hereinafter for brevity this acid is called "embonic acid" while the salt formed is called "the embonate") which is sparingly soluble in water and then treating a hot aqueous solution of the embonate with tartaric acid thereby to liberate and precipitate insoluble embonic acid leaving in solution the required bitartrate.

The initial embonate may be obtained by metathesis employing an aqueous solution containing, for example, the corresponding quaternary ammonium sulphate or halide and a water-soluble embonate, for example, sodium embonate. More particularly, it can be directly isolated from crude aqueous reaction solutions containing a corresponding quaternary ammonium salt by the addition thereto of a water-soluble embonate. This fact is of outstanding commercial importance as will now be explained. Of the theoretically suitable hexamethylene intermediates for the production of the quaternary ammonium salt of the present invention, hexamethylene diamine is to be preferred from the viewpoint of accessibility. Theoretically, this compound could be directly methylated and quaternated in a single operation using, for example, dimethyl sulphate or other reactive methyl ester such as a halide but in actual practice this was hitherto found to possess serious disadvantages arising from the formation of by-products of the methylation reaction (viz. free acid derived from the methylating agent or corresponding salt if acid-binding agent has also been used), the separation of which from the desired quaternary ammonium salt is extremely difficult. If, however, a water-soluble embonate is added to the crude reaction mixture in which any free acid has previously been neutralised and from which suspended or precipitated solids (if any) have been removed, the embonate corresponding to the desired salt is precipitated and thereby isolated. After recrystallisation (which may conveniently be effected from water) the embonate can then be converted by metathesis into the desired final product.

Yet a further feature of the present invention, therefore, consists in a process for the preparation of hexamethylene-1:6-bis-trimethyl ammonium bitartrate wherein hexamethylene diamine is reacted with a methylating and quaternating agent in the form of a reactive methyl ester such, for example, as dimethyl sulphate or methyl bromide, and, to the acid-free crude reaction mixture there is added a water-soluble embonate, the embonate thereby prepicitated being isolated and converted into the desired bitartrate by treatment in solution with tartaric acid or an acid salt thereof.

An alternative, but less preferred, method for the preparation of the desired bitartrate consists in preparing the quaternary ammonium hydroxide, for example, by quaternation of 1:6-bis-(N-dimethyl)-hexamethylene diamine followed by decomposition of the product with caustic soda or caustic potash under conditions leading to substantially complete precipitation of the inorganic salt formed, and subsequently treating the quaternary ammonium hydroxide with tartaric acid.

The present invention is illustrated by the following non-limitative examples:

Example I

Hexamethylene diamine (116 gms.), sodium carbonate (466 gms.), and water (800 mls.) were heated to 60° C. and dimethyl sulphate (830 gms.) added with stirring over 1½ hours keeping the temperature below 90° C. The reaction mixture was then stirred at 90° C. for 2 hours, then cooled to 20° C., acetone (1200 mls.) added and the whole cooled to 0° C.

The solid formed was removed by filtration and washed with acetone (150 mls.). Filtrate and washings were diluted with water to 4 litres and heated to 60 C. under reflux. To this was added a solution prepared from embonic acid (388 gms.), sodium hydroxide (80 gms.) and water (5 litres), the whole refluxed for 10 minutes and thereafter allowed to cool overnight.

The resultant embonate (530 gms.) was filtered off, washed twice with a solution of acetone (75 mls.) in water (425 mls.), and dried at 100° C. 588 gms. of the embonate were dissolved in boiling water (4 litres).

A solution of tartaric acid (300 gms.) in water (1 litre) was added slowly at the boil and the precipitated embonic acid removed by filtering hot and washing twice with hot water (1 litre). The filtrate and washings were evaporated in a steam pan to a thick syrup which was granulated by stirring with ethyl alcohol (1500 mls.). The ethyl alcohol was removed by filtration and hexamethylene-1:6-bis-trimethyl ammonium bitartrate (400 gms.) was obtained as the monohydrate by recrystallisation from methyl alcohol (700 mls.). It has a decomposition point, varying somewhat with the rate of heating, but generally lying between 185–188° C.

The embonic acid which is regenerated can, of course, be used for the next operation. Owing to its extreme insolubility, the loss is extremely small.

Example II

A mixture of 1:6-bis(N-dimethly)-hexamethylene diamine (174.5 gms.) and methanol (460 gms.) was heated to the boil under reflux and dimethyl sulphate (264 gms.) was run in at such a rate as to maintain steady reflux. This took half an hour. After boiling under reflux for half an hour, the bulk of the methanol was distilled off and water (400 ccs.) added to the residue. Estimation at this stage showed that the free acidity of the solution was equivalent to 0.06 mol. of $H_2SO_4$ per mol. of base. The mixture was then boiled under reflux overnight and 200 ccs. of methanol-water mixture was then distilled off.

Water was then added whilst water containing a little methanol was distilled off at the same rate until the free acidity corresponded to 1 mol. of $H_2SO_4$ per mol. of base.

The residual solution was then evaporated to small volume and the bisulphate of the said base was precipitated by addition of acetone. The product was filtered, washed with acetone, and dried. The direct yield was 90% of theory.

The crude bisulphate was suspended in 5 vols. of absolute alcohol and a slight deficiency of 40% w./w. aqueous caustic soda solution over that required to precipitate the whole of the sulphate ion as sodium sulphate was added.

After stirring, the sodium sulphate was filtered off and tartaric acid was added to the filtrate until the lower layer which separated no longer reacted alkaline to phenolphthalein. Additional tartaric acid equal to the weight previously added was then stirred into the mixture and after allowing to stand and separate, the upper alcohol layer was decanted off.

The lower layer was diluted with water, charcoaled, filtered and concentrated at a liquid temperature of 113° C. On cooling and seeding crystals of the required bitartrate separated. These were filtered, washed with alcohol and dried.

I claim:

1. A process for the preparation of hexamethylene - 1:6 - bis - trimethylammonium bitartrate which comprises reacting hexamethylene diamine with a methylating and quaternating agent in aqueous medium to form an acid-free crude reaction mixture, adding to that reaction mixture a water-soluble salt of 2:2-dihydroxy-1:1-dinaphthylmethane-3:3-dicarboxylic acid thereby to precipitate hexamethylene-1:6-bis-trimethylammonium salt of 2:2-dihydroxy-1:1-dinaphthylmethane-3:3-dicarboxylic acid, isolating the precipitate and converting the same into the corresponding bitartrate by reaction with a member of the class consisting of tartaric acid and acid salts thereof, removing precipitated 2:2-dihydroxy-1:1-dinaphthylmethane-3:3 - dicarboxylic acid, and recovering the hexamethylene-1:6-bis-trimethylammonium bitartrate thus formed.

2. A process for the preparation of hexamethylene-1:6-bis - trimethylammonium bitartrate which comprises reacting hexamethylene diamine with a methylating and quaternating agent in aqueous medium to form an acid-free crude reaction mixture, removing solids from and adding to that reaction mixture a water-soluble salt of 2:2 - dihydroxy-1:1-dinaphthylmethane-3:3-dicarboxylic acid, thereby to precipitate hexamethylene-1:6-bis-trimethylammonium salt of 2:2-dihydroxy-1:1-dinaphthylmethane - 3:3-dicarboxylic acid, isolating the precipitate and converting the same into the corresponding bitartrate by reaction in solution with tartaric acid, removing from such solution the 2:2-dihydroxy-1:1-dinaphthylmethane - 3:3-dicarboxylic acid thereby precipitated, and recovering the hexamethylene-1:6-bis-trimethylammonium bitartrate thus formed.

3. A process for the preparation of hexamethylene-1:6-bis - trimethylammonium bitartrate which comprises reacting hexamethylene diamine with a methylating and quaternating agent in aqueous medium to form an acid-free crude reaction mixture, adding to that reaction mixture a water-soluble salt of 2:2-dihydroxy-1:1-dinaphthylmethane-3:3-dicarboxylic acid thereby to precipitate hexamethylene-1:6-bis-trimethylammonium salt of 2:2-dihydroxy-1:1-dinaphthylmethane-3:3-dicarboxylic acid, isolating the precipitate and forming a hot aqueous solution therefrom, reacting said solution with tartaric acid, removing insoluble 2:2-dihydroxy-1:1-dinaphthylmethane-3:3-dicarboxylic acid thereby precipitated, and recovering the hexamethylene- 1:6 - bis - trimethylammonium bitartrate thus formed.

4. A process for the preparation of hexamethylene-1:6-bis - trimethylammonium bitartrate which comprises reacting hexamethylene diamine with a methyl ester capable of methylating and quaternating the diamine in aqueous medium to form an acid-free crude reaction mixture, adding to that reaction mixture a water-soluble salt of 2:2-dihydroxy-1:1-dinaphthyl-methane-3:3-dicarboxylic acid thereby to precipitate hexamethylene - 1:6 - bis trimethylammonium salt of 2:2-dihydroxy-1:1-dinaphthyl-methane-3:3-dicarboxylic acid, isolating the precipitate and converting the same into the corresponding bitartrate, by reacting same with a compound yielding a tartaric acid radical under the conditions of reaction, and recovering the hexamethylene - 1:6 - bis-trimethylammonium bitartrate thus formed.

5. A process for the preparation of hexamethylene-1:6-bis - trimethylammonium bitartrate which comprises reacting hexamethylene diamine with dimethyl sulphate in aqueous medium to form an acid-free crude reaction mixture, adding to that reaction mixture a water-soluble salt of 2:2-dihydroxy-1:1-dinaphthyl-methane-3:3-dicarboxylic acid thereby to precipitate hexamethylene - 1:6 - bis-trimethylammonium salt of 2:2-dihydroxy-1:1-dinaphthyl-methane-3:3-dicarboxylic acid, isolating the precipitate and converting the same into the corresponding bitartrate by reacting same with a compound yielding a tartaric acid radical under the conditions of reaction, and recovering the hexamethylene - 1:6 - bis-trimethylammonium bitartrate thus formed.

HARRY JAMES BARBER.

References Cited in the file of this patent

UNITED STATES PATENTS

| Number | Name | Date |
|---|---|---|
| 2,130,947 | Carothers | Sept. 20, 1938 |
| 2,375,853 | Kirby et al. | May 15, 1945 |

OTHER REFERENCES

Paton et al.: Nature, vol. 162, p. 810 (1948).